March 17, 1970 H. R. LINDESMITH ET AL 3,500,956
LADDER CONSTRUCTIONS

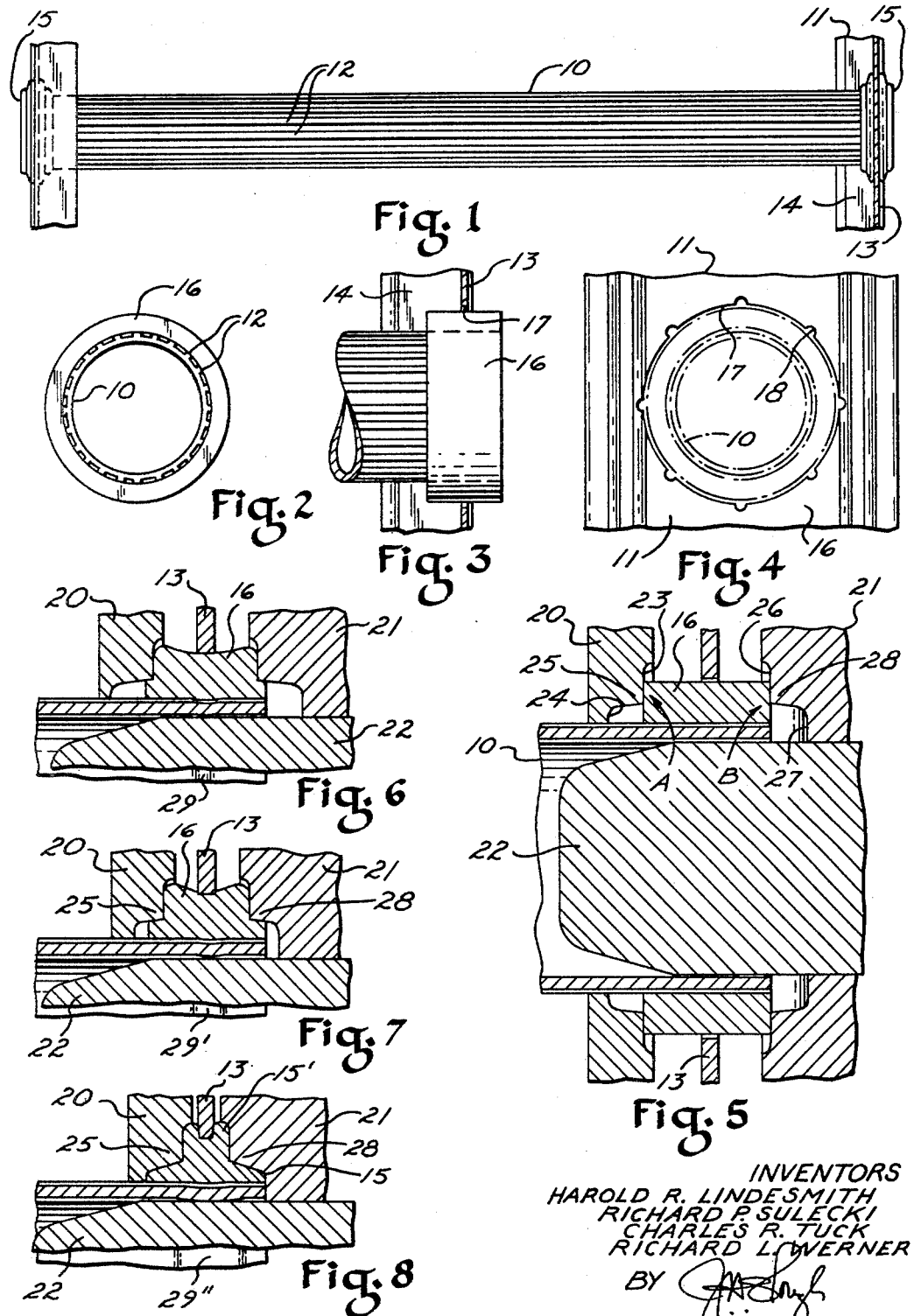

Original Filed Oct. 19, 1967 5 Sheets-Sheet 2

INVENTORS
HAROLD R. LINDESMITH
RICHARD P. SULECKI
CHARLES R. TUCK
RICHARD L. WERNER
BY
J. H. SLOUGH
ATTORNEY

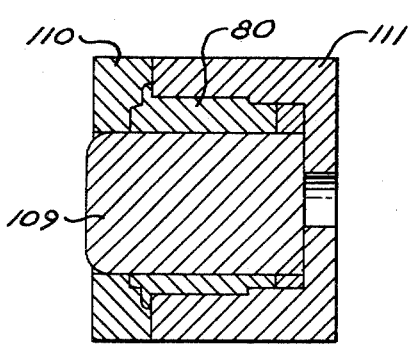
Fig. 29
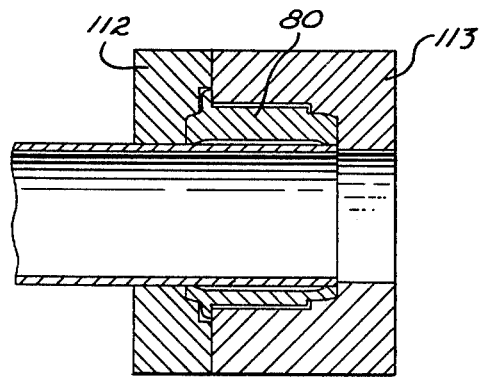
Fig. 30
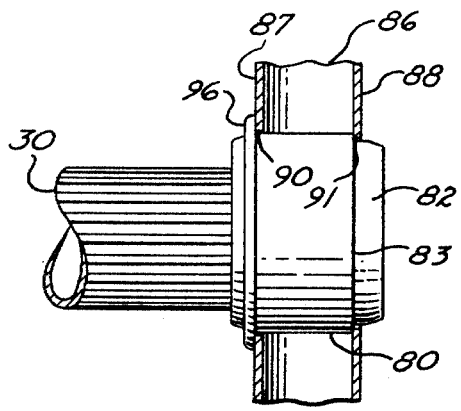
Fig. 31
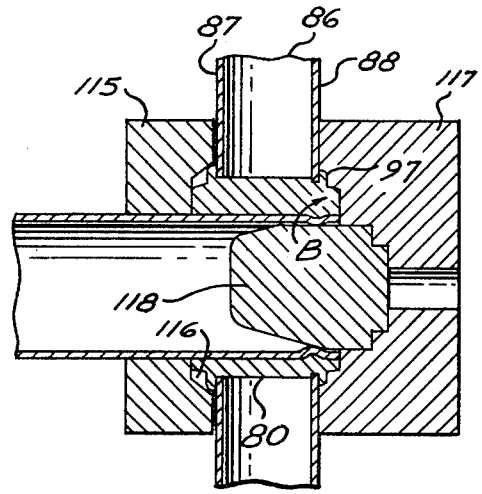
Fig. 32
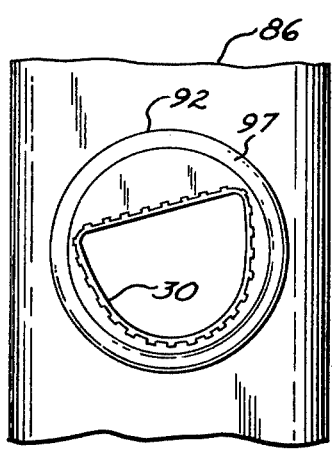
Fig. 33
INVENTORS
HAROLD R. LINDESMITH
RICHARD P. SULECKI
CHARLES R. TUCK
RICHARD L. WERNER
BY 
J. H. SLOUGH
ATTORNEY

United States Patent Office 3,500,956
Patented Mar. 17, 1970

3,500,956
LADDER CONSTRUCTIONS
Harold R. Lindesmith, Greenville, Richard P. Sulecki, Transfer, Charles R. Tuck, Greenville, and Richard L. Werner, Sharon, Pa., assignors to R. D. Werner Co., Inc., Greenville, Pa., a corporation of Pennsylvania
Original application Oct. 19, 1967, Ser. No. 676,477. Divided and this application Nov. 1, 1968, Ser. No. 772,518
Int. Cl. E06c 7/08
U.S. Cl. 182—228        10 Claims

ABSTRACT OF THE DISCLOSURE

There is disclosed herein a rung-to-side-rail ladder joint construction and method therefor comprising providing the end portion of a rung with a sleeve shaped ferrule blank having a substantial wall thickness, projecting the end portion with the blank thereon through a pierced side rail, and shearing away portions of the blank inwardly from the ends thereof to form flanges on either side of the rail.

---

The invention relates to improvements over the invention disclosed in United States Letters Patent No. 3,039,186 dated June 19. 1962, and assigned to the assignee of the present invention, and is a divisional of application for United States Letters Patent Ser. No. 676,477 filed Oct. 19, 1967, for Ladder Constructions.

This invention relates to ladder construction and more particularly to rung-to-side-rail joints or connections.

In the prior art construction, the end portion of a tubular rung was provided with a ferrule blank in the form of a relatively thin-walled sleeve of malleable metal, the sleeve being press-fitted onto the end portion of the rung prior to forming a finished ferrule. The web of a channel shaped side rail was pierced whereby the run end portion with the sleeve or blank fitted thereon could be projected through the rail, the sleeve then being swaged endwise or in an axial direction by suitable die means whereby the sleeve was formed into a ferrule having radially extending flange portions gripping either side of the web around the periphery of the rail aperture. In the course of the swaging operation, the sleeve reacted like a short column under compression and buckled to form an annular bulge or node. Radial inward flow of the metal tightly gripped the rung, and the radial outward flow of metal pressed against the edge of the rail aperture which split the metal and caused it to flow over the flat surface portions of the web surrounding the aperture. The result was an extreme compression-tension fit between the ferrule and side rail web, and between the ferrule and rung producing a joint having great strength and structural integrity.

The present invention differs from the invention referred to in that a relatively thick-walled ferrule blank or sleeve is provided which may be either press-fitted upon the end portion of the rung or loosely telescoped thereover and subsequently crimped into engagement therewith. The rung end portion with the ferrule blank thereon is then projected through a pierced side rail and formed in die members which move axially with respect to the blank and shear away an outer portion of the wall of the blank away from the inner portion thereof, said outer portion being formed into flanges which tightly engage edge portions of the rail around the aperture therein. There is no buckling of the ferrule blank although the compression forces cause the metal of the blank to expand both radially, outwardly and inwardly. One of the advantages of the present invention is that it is possible to use a ferrule blank having a circular outer circumferential surface and a noncircular inner surface whereby a noncircular rung can be mounted in a circular opening in the side rail. This has obvious advantages in that a circular opening is the easiest configuration to make and a circular forming cavity in a die can be readily made by simple machining methods.

The rung-to-rail joint of the present invention may also be constructed by preforming one flange of the ferrule and then pressing or crimping the ferrule blank to the rung or pressing or crimping the ferrule blank onto the rung while simultaneously preforming one flange of the ferrule. The joint and method for making the same may further be adapted for use with either rails having a single wall or hollow rails having double walls.

It is an object of this invention to provide an improved ladder rung-to-rail joint of the type referred to and a method for constructing the same wherein only a portion of the ferrule material is used to form flanges for gripping edge portions of a rail wall surrounding an aperture in said wall.

Another object of this invention is to provide a rung-to-rail joint and method of construction wherein an outer peripheral portion of a substantially thick ferrule blank is sheared away from the inner portion thereof to form retaining flange means gripping the side rail.

Still another object of the invention is to provide a joint and method of construction as set forth above wherein the ferrule blank may be initially either a pressed-on or loose fit.

Yet another object of the invention is to provide a joint and method of construction having the above features and characteristics adapted for use in mounting either a circular or noncircular rung to a side rail either single- or double-walled construction.

A further object of this invention is to provide a joint and method of construction wherein a noncircular rung can be mounted in either a circular or a noncircular mounting aperture in a side rail.

An additional object of this invention is to provide a joint and method of construction wherein a noncircular rung can be mounted in either a circular or a noncircular mounting aperture in a side rail.

An additional object of this invention is to provide a joint and method of constructing the same as set forth above which eliminates buckling of the ferrule blank when axial compression is applied thereto.

Still another object of the invention is to provide a joint and method of construction having the above features and characteristics wherein the connecting ferrule is adapted to be partially preformed either on or off of the rung.

Other objects of the invention and the invention itself will be readily understood from the following description of several embodiments thereof and the accompanying drawings, in which said drawings:

FIGURE 1 is a front elevation of a ladder rung and portions of ladder side rails, one side rail portion being sectioned to more clearly disclose a rung-to-rail joint or connection according to one embodiment of this invention;

FIGURE 2 is an end view of the rung showing a ferrule blank telescoped thereover;

FIGURE 3 is a view of an end portion of the rung with the ferrule blank mounted thereon showing the same inserted through the web of a pierced side rail;

FIGURE 4 is a fragmentary side elevation of a side rail showing the rung mounting aperture thereof, the rung and ferrule blank being shown in broken lines;

FIGURE 5 is a longitudinal section of the end portion and ferrule of FIGURE 3 showing a pair of die members in open position;

FIGURES 6, 7 and 8 are fragmentary details showing the die members in progressive stages of closing whereby a ferrule according to one embodiment of the present invention is formed for connecting the rung to the side rail;

FIGURE 29 is a section showing a pair of dies preforming a ferrule blank of the type shown in FIGURE 22;

FIGURE 30 is a longitudinal section showing a pair of dies crimping a preformed ferrule blank of the type shown in FIGURE 22 onto a rung end portion;

FIGURE 31 shows the rung end portion and ferrule blank of FIGURE 30 inserted through the pierced side rail of FIGURE 23;

FIGURE 32 is a longitudinal section showing a pair of dies finish-forming the preformed, crimped-on ferrule blank of FIGURES 30 and 31; and FIGURE 33 is a fragmentary side elevation of the side rail of FIGURE 23 showing the ferrule of FIGURE 22 in finished form.

Figure 9:
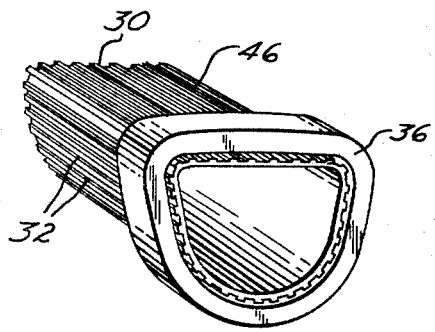
FIGURE 9 is a perspective view of a D-shaped rung end portion and ferrule blank according to a second embodiment of the invention.

Referring now to the drawings in all of which like parts are designated by like reference numerals and particularly to FIGURE 1, a tubular ladder rung is shown at 10 connected at the ends thereof to a pair of channel-shaped side rails 11. The rung 10 as herein illustrated is provided with longitudinally disposed, radially outwardly projecting ribs 12, and each side rail 11 comprises a central web 13 and inwardly projecting parallel flanges 14 projecting from the lateral edges of said web. The end portions of the rung 10 are connected to the web 13 by means of ferrules 15 of identical form wherefor only one of said ferrules will be described in detail in the following written description. Although the flanges 14 project inwardly as herein illustrated, it will be readily understood that said flanges may project either inwardly or outwardly, the same being no part of the present invention.

The tubular rungs and side rails of the present invention may be made of any suitable material such as steel, aluminum, aluminum alloy, or fiber glass reinforced plastic, and the ferrules 15 are made of a suitable malleable material which can be caused to form or flow under pressure, an excellent example of such material being aluminum or an aluminum alloy.

FIGURES 2-8 show details of the method in which the ferrules 15 are formed to provide the ladder rung-to-siderail joint of this invention according to a first embodiment thereof. As shown in FIGURES 2 and 3, an end portion of the rung 10 is provided with a sleeve or ferrule blank 16 which completely surrounds said end portion of the rung and comprises an annular wall of substantial thickness. As herein illustrated, the rung 10 is circular in cross section but it will be readily understood that said rung may be elliptical, rectangular, triangular, or of any other suitable cross sectional form. The sleeve or ferrule blank 16 is also circular and as herein illustrated has an inner diameter slightly less than the maximum outer diameter of the rung whereby said blank has an interference fit with the rung and must be forced or pressed thereon. The side rail 11 as shown in FIGURE 4 is provided with a generally circular opening 17 which is slightly larger than the outer diameter of the blank 16 and which said opening has circumferentially spaced, radially outwardly projecting notches or pips 18; however, said pips are optional.

As a first step in assembling the rung 10 to a side rail 11, the end portion of said rung with the ferrule 16 pressed thereon is projected through the opening 17 with substantially equal portions of said blank projecting on either side of the web 13. A pair of die members 20 and 21 are then brought into engagement with the ferrule blank 16 to form said ferrule blank into a finished ferrule 15.

Referring now to FIGURE 5 of the drawings, the die member 20 engages the rung 10 on the inside of the side rail, and the die member 21 is adapted to be aligned in any suitable manner with the rung 10 and with the die member 20. A pilot member 22 is carried by said die member 21 and projects into the end of the tubular rung 10. The die members 20 and 21 are associated with conventional means (not herein illustrated) for moving said die members toward and away from each other for forming the ferrule 15.

The die member 20 has an annular, step cavity generally indicated at A comprising an outer, shallow cavity portion 23 and an inner, deep cavity portion 24. The transition from the shallow cavity portion 23 to the deep cavity portion 24 is substantially abrupt thereby providing a shearing edge portion 25 disposed radially intermediate the inner and outer peripheries of the ferrule blank 16. The die member 21 is similarly provided with a stepped molding cavity generally indicated at B comprising an outer, shallow cavity portion 26 and an inner, deep cavity portion 27. Between the cavity portions 26 and 27 there is provided a shearing edge portion 28 which is substantially similar to the shearing edge portion 25 and which is disposed substantially the same radial distance outwardly from the axis of the die members 20 and 21.

FIGURES 6–8 show in three graduated stages the manner in which the closing die members 20 and 21 form the ferrule 15. As shown in FIGURE 6, as said die members move inwardly toward the web 13 and toward each other, the shearing edge portions 25 and 28 shear the outer portion of the substantially thick ferrule blank 16 away from the remainder of the ferrule body, literally scooping the malleable material upwardly in front of said shearing edge portions as the die members move together. Because of the substantial thickness of the blank 16, axial pressure from the shearing edge portions 25 and 28 cannot cause buckling or folding of said blank. The malleable material of the blank which is disposed between the shearing edge portions 25 and 28 is greatly compressed causing it to flow upwardly into the outer, shallow cavity portions 23 and 26 and upwardly against the inner edge of the opening 17 and into the pips 18. A reactive force is also effected radially inwardly against the end portion of the rungs 10 causing the material of the flange blank 16 to flow in between the longitudinal ribs 12, said pressure further causing an inward annular bulge of the tubular rung 10, said bulge being indicated at 29 and controlled by the pilot member 22.

Further inward movement of the die members 20 and 21, illustrated in FIGURE 7, causes the material of the ferrule blank 16 to flow even further outwardly into the shallow cavities 23 and 26 and to begin to flow outwardly along the flat surface portions of the web 13 which surround the opening 17. At the same time, the annular bulge 29 caused by the reactive inward force widens as indicated at 29'.

FIGURE 8 shows the die members 20 and 21 in their closed position wherein the material of the ferrule blank 16 completely fills the outer shallow cavities 23 and 26 and has flowed outwardly a substantial distance on either side of the web 13 to form flanges 15'. At the same time, the radially inwardly disposed portion of the material of the ferrule blank has been formed to the inner contours of the deep cavities 24 and 27 whereby the ferrule 15 in its final form results. At this time, the radially inward bulge has become substantially wide as indicated at 29" whereby the ferrule 15 tightly grips the end portion of the rung over a substantial area. The foregoing ladder joint construction provides substantial radial inward and outward pressure between the rung and side rail as well as mechanically engaging the same by the flanges 15' engaging either side of the web 13 and the inward annular bulge 29" engaging the rung.

In the second embodiment of the invention, a D-shaped rung 30 is adapted to be connected to a side rail 31 having a central web 33 and parallel edge flanges 34. Said rung 30 as herein shown is also provided with longitudinally disposed, outwardly projecting ribs 32 in a manner similar to the ladder rung 10 of the first embodiment.

Figure 10:
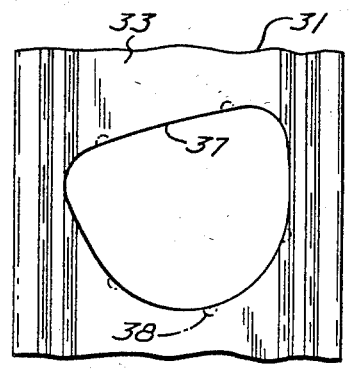
FIGURE 10 is a fragmentary side elevation of a side rail pierced to receive the rung end portion and ferrule of FIGURE 9.

As shown in FIGURE 9, the end portion of the D-shaped rung 30 is provided with a loosely fitting D-shaped ferrule blank 36 adapted to project through an opening 37 of similar shape provided in the web 33. The periphery of the opening 37 may be provided with pips 38 shown in broken lines in FIGURE 10.

Figure 11:
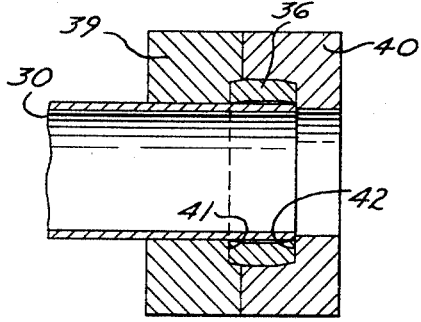
FIGURE 11 is a longitudinal section of the rung end portion and ferrule of FIGURE 9 showing a pair of crimping dies in association therewith.
Figure 12:
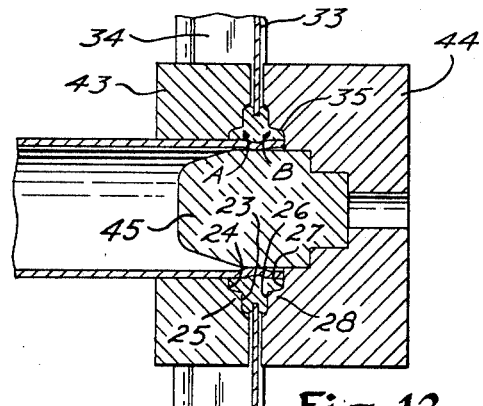
FIGURE 12 is a longitudinal section of the rung end portion and ferrule of FIGURE 9 showing a pair of forming dies in closed position forming a ferrule.

Referring now to FIGURE 11 of the drawings, the loosely fitting ferrule blank 36 is preferably first crimped at the ends thereof to the end portion of the rung 30 by a pair of suitable die members 39 and 40. Said die members 39 and 40 are provided with tapered annular cavities 41 and 42, respectively, so shaped that when said die members are closed upon the ferrule blank 36, the ends of said blank are swaged or crimped inwardly tightly against the rung 30. The crimping operation assured that the ferrule blank 36 will be positioned with one end thereof aligned with the end of the rung and that it will maintain such position during the final swaging or forming shown in FIGURE 12. In such final forming, the end portion with the ferrule blank 36 thereon is projected through the opening 37 in the web 33 and a pair of inner and outer die members 43 and 44, respectively, are closed upon said blank to form a finished ferrule 35. The outer die member 44 is provided with a suitable pilot member 45. The inner die member 43 and the outer die member 44 are provided with annular stepped cavities A and B, respectively, of the same form as those shown in the first embodiment, said cavities comprising outer, shallow cavity portions 23 and 26 and inner, deep cavity portions 24 and 27, respectively. The die member cavities are also provided with shearing edge portions 25 and 28 described in connection with the first embodiment of the invention, and it will be understood that the ferrule 35 is formed with the same shearing and flowing action as described above.

Figure 13:
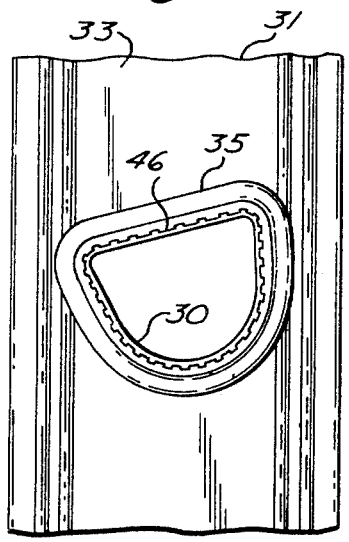
FIGURE 13 is a fragmentary side elevation of the side rail of FIGURE 10 showing the ferrule blank of FIGURE 9 in finished form.

FIGURE 13 shows the appearance of the D-shaped ferrule 35 in its finished form and as applied to the web 33 of the side rail 31. The D-shaped rung 30 is mounted at a slight angle with respect to the side rail 31 whereby the flat upper surface of said D-shaped rung, indicated at 46 in FIGURE 9, will be substantially level when the ladder is angled or leaned against a vertical supporting surface.

It will be further noted at this point that the ferrule blank 16 of the first embodiment may, like the ferrule blank 36 of the second embodiment, be a loose fit upon the end portion of the rung 10. This merely involves providing an inner diameter to the ferrule blank 16 which is slightly larger than the outer maximum diameter of the rung 10. In this situation, the ferrule blank 16 would be first crimped onto the rung 10 in the manner illustrated in FIGURE 11, a cross section of such crimping being substantially similar to the last mentioned figure.

Figure 14:
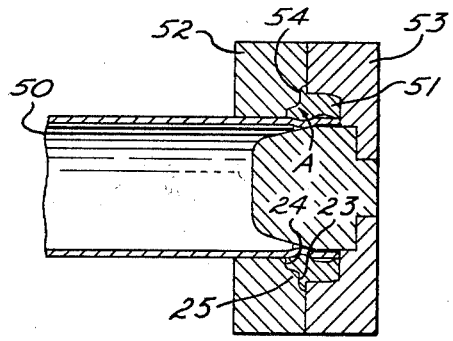
FIGURE 14 is a longitudinal section of the rung end portion and ferrule blank of FIGURE 9 showing a pair of dies preforming one end of the ferrule and simultaneously crimping the ferrule blank to the rung.
Figure 15:
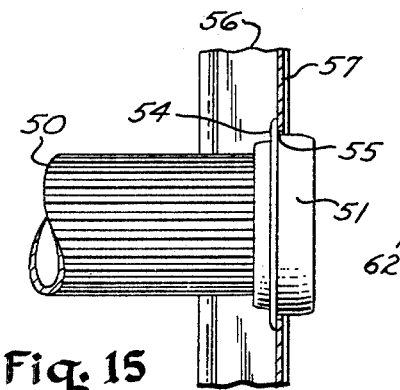
FIGURE 15 shows the rung end portion with the preformed ferrule blank of FIGURE 14 thereon inserted through the web of a pierced side rail.

FIGURES 14–17 show variations in the method of the present invention the principles of which will be readily understood from the foregoing description without undue elaboration. In FIGURE 14, the end portion of a ladder rung 50 having any suitable cross sectional shape is provided with an initially loosely fitting ferrule blank 51. Outer and inner die members 52 and 53 are then applied to crimp said ferrule blank onto the end portion of the rung 50. In this instance, however, the inner die member 52 in provided with the above-described stepped cavity A comprising the outer shallow cavity portion 23, the inner, deep cavity portion 24, and the aforementioned shearing edge portion 25. Thus in a single operation of closing the die members 52 and 53, the ferrule blank 51 is crimped onto the end portion of the rung 50 and at the same time has one-half of the ferrule preformed with a flange shown at 54. FIGURE 15 shows the manner in which the end portion of the rung 50 is projected through a suitable opening 55 in a side rail 56 with the flange 54 disposed against the inner surface of a side rail web shown at 57. The rung-to-side-rail connection may then be completed by placing the rung and preformed ferrule blank 51 into a pair of dies similar to those shown in FIGURE 12.

Figure 16:
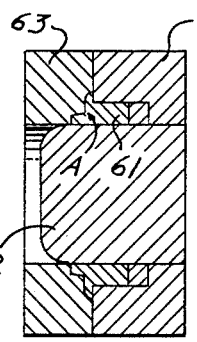
FIGURE 16 is a section showing a pair of dies preforming a ferrule blank.
Figure 17:
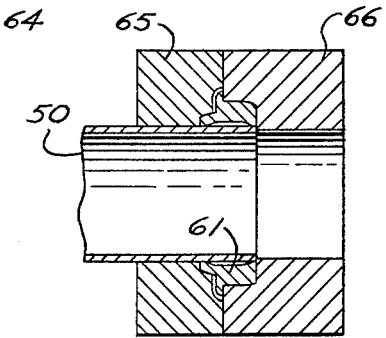
FIGURE 17 is a section showing a pair of dies crimping the preformed ferrule blank of FIGURE 16 onto a rung end portion.
Figure 21:
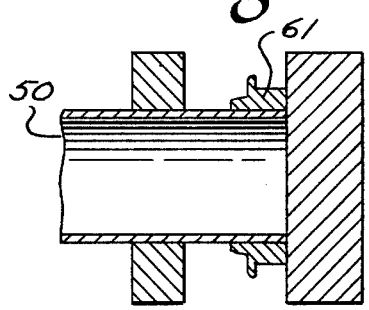
FIGURE 21 is a longitudinal section of a rung end portion showing a preformed ferrule blank of the type shown in FIGURE 16 being press-fitted thereon.
Figure 22:
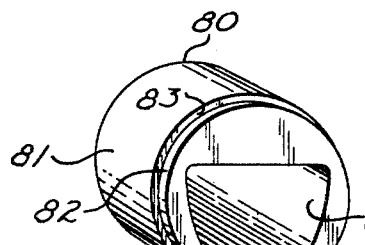
FIGURE 22 is a perspective view of a ferrule blank according to a fourth embodiment of the invention.

FIGURE 16 shows a ferrule blank 61 being preformed about a pilot member 62 between reciprocating die members 63 and 64. Only the die member 63 is provided with the above described stepped cavity A, and the inner diameter of the preformed ferrule blank may be such that the same is a loose fit upon the rung 50 shown in FIGURE 17 whereby the same can be crimped to the end portion of said rung 50 by suitable crimping die members 65 and 66. It will be further understood that the inner diameter of the ferrule blank 61 may be slightly smaller than the outer maximum diameter of the rung 50 whereby said ferrule blank can be pressed onto the end portion of the rung. The last mentioned variation is illustrated in FIGURE 21.

Figure 20:
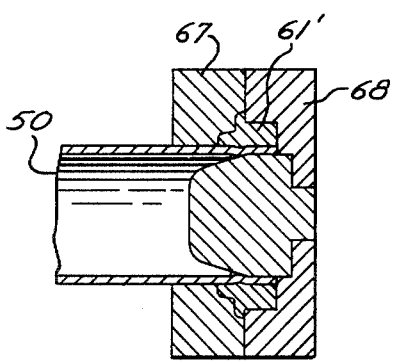
FIGURE 20 is a longitudinal section of the rung end portion showing a pair of dies preforming a pressed-on ferrule blank of the type shown in FIGURE 2.

A still further variation is shown in FIGURE 20 wherein a ferrule blank 61' is preformed and at the same time pressed onto a rung 50'. This would involve a press-fitted type ferrule blank as shown in the first embodiment of the invention which is preformed upon the end portion of the rung by suitable die members 67 and 68. It will be understood that this procedure could be applied to a D-shaped rung of the type shown in FIGURE 9 or to a rung having any other suitable cross sectional shape.

Figure 18:
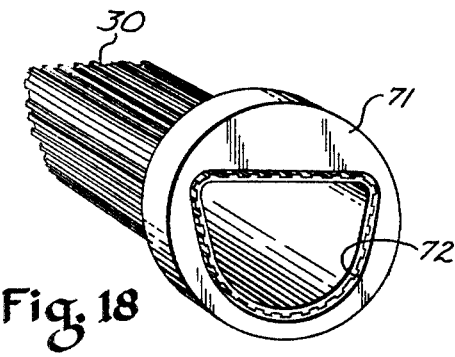
FIGURE 18 is a perspective view of a rung end portion and ferrule blank according to a third embodiment of the invention.
Figure 19:
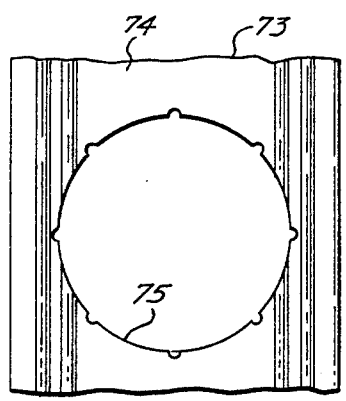
FIGURE 19 is a fragmentary side elevation of a side rail pierced to receive the rung end portion and ferrule of FIGURE 18.

In the third embodiment illustrated in FIGURE 18, a ferrule blank 71 having an outer circular periphery is provided with a D-shaped aperture 72 adapted to loosely receive the end portion of a D-shaped rung 30. FIGURE 19 shows a side rail 73 of the same type shown in the foregoing embodiments of the invention, said side rail 73 having a web 74 further modified by having a circular opening 75 which is somewhat larger than the opening shown in FIGURE 4 whereby it is adapted to receive the circular ferrule blank 71 having the D-shaped aperture 72 therein. The modified ferrule blank for a D-shaped rung is utilized in the same manner as that set forth above in connection with circular or D-shaped ferrule blanks for use with circular or D-shaped rungs, respectively. Where the D-shaped rung 30 is a loose fit as illustrated in FIGURE 18, the ferrule blank 71 would be preferably first crimped to the end portion of the rung. However, it will be readily understood that the dimensions of said D-shaped aperture 72 may be such that said ferrule blank has an interference fit with the rung and can be pressed thereon. The dies for subsequently finish forming the ferrule would, of course, be provided with circular stepped cavities A and B of the type shown in connection with the first embodiment of the invention.

Figure 23:
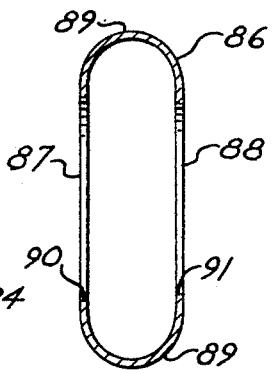
FIGURE 23 is a transverse section of a hollow rail adapted to receive the ferrule blank of FIGURE 22.
Figure 24:
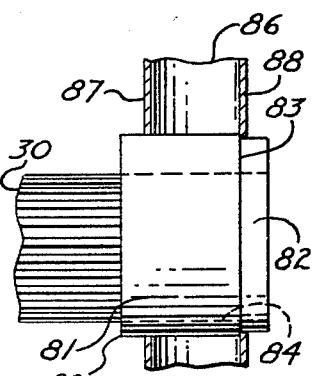
FIGURE 24 shows a rung end portion carrying the ferrule blank of FIGURE 22 inserted through the pierced side rail of FIGURE 23.
Figure 25:
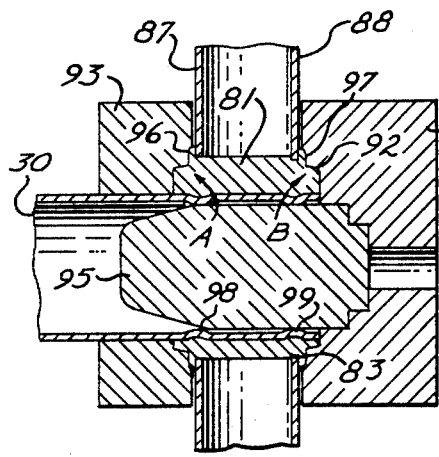
FIGURE 25 is a longitudinal section of the rung end portion and ferrule blank of FIGURE 24 showing a pair of forming dies in closed position forming a ferrule.

Referring now to FIGURES 22–25, the fourth embodiment of the invention comprises means for attaching a D-shaped rung of the type shown at 30 to a hollow rail of the type disclosed in FIGURE 23. In said fourth embodiment, an axially elongated ferrule blank 80 is provided, said blank having a cylindrical body portion 81 and a diametrically reduced, radially inwardly stepped portion 82. Between the body portion 81 and the stepped portion 82 there is provided an annular shoulder 83, and the blank 80 with a D-shaped rung 30. In FIGURES 24 and 25, the inner dimensions of the opening 84 are such that the ferrule blank 80 is a press fit upon the end portion of the rung 30, but as hereinlater discussed, it may be a loose fit if desired.

FIGURE 23 shows a transverse section of a hollow side-rail 86 having flat, laterally spaced side walls 87 and 88 joined at the front and rear of said rail by arcuate portions 89. It will be understood that the exact configuration of the portions 89 is not critical to the present embodiment and the same may be flat, tapered, corrugated, or otherwise differently shaped.

The side wall 87 is provided with a circular aperture 90 adapted to slidably receive the body portion 81, and the side wall 88 is provided with a circular aperture 91 adapted to slidably receive the stepped portion 82. The ferrule blank 80 with the end portion of the rung 30 press-fitted therein is projected through the aligned apertures 90 and 91 in the manner illustrated in FIGURE 24 with the annular shoulder 83 abutting the inner surface portions of the side wall 88 which surrounds the aperture 91. The ferrule blank 80 is then finish-formed into a ferrule 92 by a pair of coacting die members 93 and 94. The die member 83 engages the rung 30 on the rail 86 and the die member 94 having a pilot member 95 is disposed on the outside of said rail. As the die members close on each other, the pilot member 95 projects into the open end portion of the rail 30. The die member 93 has an annular, stepped forming cavity A and the die member 94 has an annular, stepped forming cavity B as hereinabove described whereby the ferrule 92 is formed. The resulting ferrule has an inner flange 96 which is formed outwardly over the outer surface portions of the wall 87 surrounding the aperture 90 whereas the outer end of the ferrule has an outer flange 97 which is formed outwardly over the outer surface portion of the wall 88. The ferrule 92 has two main radial pressure areas disposed in the planes of the side walls 87 and 88 the effect of which is represented by the bulges 98 and 99 in the tubular rail 30. The central portion 81' of the ferrule 92 bridges the space between the parallel side walls 87 and 88 which are prevented from collapsing inwardly during the forming operation due to the fact that the side wall 88 is in abutment with the annular shoulder 83 and cannot move toward the side wall 87. The only inward pressure exerted against the side wall 87 is that of the formed inner flange 96 which is insufficient to collapse the hollow rail 86.

FIGURES 26 through 32 illustrate various approaches to forming the ferrule of the type shown at 92 in FIGURE 25, such variations being similar to those set forth above in relation to FIGURES 14–17, 20, and 21.

Figure 26:
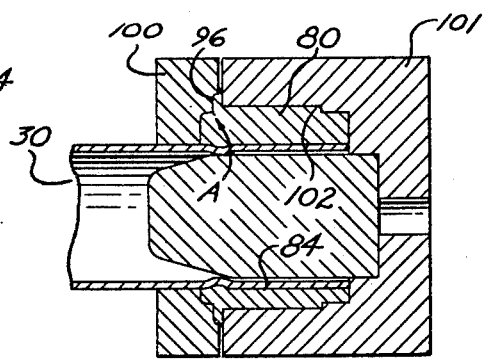
FIGURE 26 is a longitudinal section of the rung end portion showing a pair of dies preforming a pressed-on ferrule blank of the type shown in FIGURE 22.

FIGURE 26 illustrates the manner in which a ferrule blank 80 having a through opening 84 of slightly reduced dimension is both press-fitted and preformed upon the end portion of a rung 30 for subsequent finish forming in the manner shown in FIGURE 25. In FIGURE 26, a die member 100 has a stepped forming cavity A for forming the inner flange 96 whereas a die member 101 has a stepped cavity 102 which is merely adapted to receive and maintain the shape of the stepped end portion of the ferrule blank 80 and press said ferrule blank onto the end portion of the rung 30.

Figure 27:
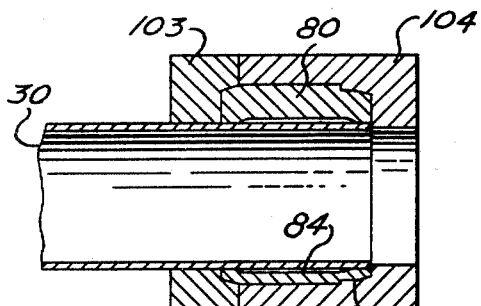
FIGURE 27 is a longitudinal section of the rung end portion and a ferrule of the type shown in FIGURE 22 showing a pair of crimping dies in association therewith.

FIGURE 27 shows the manner in which a loosely fitting ferrule blank 80 is crimped at the ends thereof onto an end portion of a rung 30 by crimping die members 103 and 104. This prepares the ferrule blank 80 for finish forming in the manner as disclosed in FIGURE 25.

Figure 28:
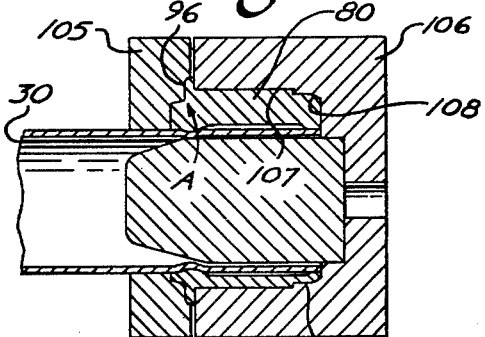
FIGURE 28 is a longitudinal section of the rung end portion and ferrule blank of FIGURE 22 showing a pair of dies preforming one end of the ferrule and simultaneously crimping the ferrule blank to the rung.

FIGURE 28 illustrates the manner in which a loosely fitting ferrule blank 80 is simultaneously crimped and preformed upon the end portion of a rung 30 by preforming and crimping die members 105 and 106. The die member 105 is provided with a stepped forming cavity A for forming the inner flange 96 of the ferrule whereas the die member 106 is provided with a cavity 106 having a tapered inner wall portion 108 for crimping the stepped portion 82 of the ferrule blank into engagement with the rung.

FIGURE 29 shows a ferrule blank 80 being preformed about a pilot member 109 by preforming die members 110 and 111. Such preformed blank may then be either pressed upon the end portion of a rung or crimped thereto as illustrated in FIGURE 30 by crimping die members 112 and 113.

FIGURE 31 illustrates the manner in which a preformed ferrule blank 80, regardless of the manner in which it is preformed and mounted to the end portion of the rung 30, is first assembled to a hollow rail 86. The rung end portion with the preformed ferrule mounted thereto is disposed with the inner flanges 96 positioned against the outer surface portions of the wall 87 surrounding the aperture 90 and the annular shoulder 83 abutting the inner surface portions of the wall 88 surrounding the aperture 91. Finished forming is effected in the manner shown in FIGURE 32 by a retaining die member 115 having a simple tapered cavity 116 therein, allowing clearance for the preformed end of the ferrule and a forming die member 117 having a step-forming cavity B and a pilot member 118. The forming die member 117 finish forms the opposite end or the stepped end of the ferrule blank 80 thereby providing the outer flange 97 to a ferrule of the type shown at 92.

FIGURE 33 is a view similar to FIGURE 13 and shows a finished ferrule 92 as it appears from the end of the rung or the outside of the hollow rail 86. This is the appearance that a rung joint has when constructed in any of the various ways suggested in connection with FIGURES 22–32. It will be particularly noted that in this form of the invention as in the form of FIGURE 18, the outer flanges which are formed by the shearing method are circular even though the rung being attached is noncircular, such as D-shaped. It will be further noted that an outer end view of a rung to side rail connection of the type disclosed in FIGURES 18 and 19 would have a substantially similar appearance to that illustrated in FIGURE 33.

From the foregoing it will be seen that the present invention provides a construction and means for manufacturing a rung-to-side rail joint comprising the shearing and compression flowing of part of a substantially thick ferrule blank into flanges which tightly grip the outer sides of the side rail and which provide a substantial radially inwardly and outwardly directed pressure firmly securing the rung to the side rail. In other words, the finished ferrule grips both the edge of the side rail hole and the web of the rail. Certain of the foregoing embodiments have suggested that the openings may be provided with outwardly projecting notches or pips, and the rungs as herein disclosed have been provided with longitudinally directed, outwardly projecting ribs. The notches and ribs provide means for mechanically interlocking the ferrule to the side rail and the rung to the ferrule because the flowing metal of the malleable ferrule flows in between the ribs and into said notches. However, the present inventors have discovered that a rung to side rail joint having great strength and structural integrity can be made without the use of mechanical interlocking notches or ribs.

It will be understood that many changes in the details of the invention as herein described and illustrated may be made without, however, departing from the spirit thereof of the scope of the appended claims.

We claim:

1. In a ladder construction, a rung; a rail comprising wall means having an opening therethrough; a ferrule having an aperture therein telescoped over a portion of said rung; said ferrule comprising a sleeve of malleable material having a substantial wall thickness; said portion of said rung with said ferrule telescoped thereover projecting through said opening, said ferrule projecting beyond either side of the edge portions of said wall means surrounding said opening; radially outer portions only of said ferrule being sheared away inwardly from the ends of said ferrule and formed into flanges disposed in radially outwardly overlapping engagement with said edge portions of said wall means, said ferrule pressing radially inwardly and compressively engaging said portion of said rung to provide a secure rung-to-side-rail joint.

2. In a ladder construction as set forth in claim 1: said wall means comprising a single thickness of substantially flat, rigid material.

3. In a ladder construction as set forth in claim 1: said portion of said rung, said opening, and said ferrule having substantially the same cross sectional shape.

4. In a ladder construction as set forth in claim 1: said portion of said rung, said opening and said ferrule being substantially circular in cross sectional shape.

5. In a ladder construction as set forth in claim 1: said portion of said rung and said aperture in said ferrule having substantially similar cross sectional shapes; and said opening and the outer periphery of said ferrule having substantially similar shapes differing from said first mentioned shapes.

6. In a ladder construction as set forth in claim 1: said portion of said rung and said aperture in said ferrule having substantially similar, noncircular cross sectional shapes; and said opening and the outer periphery of said ferrule being circular in shape.

7. In a ladder construction as set forth in claim 1: said portion of said rung and said aperture in said ferrule being D-shaped in cross section; and said opening and the outer periphery of said ferrule being circular in shape.

8. In a ladder construction as set forth in claim 1: said wall means comprising spaced, parallel walls of a hollow rail; and said opening means comprising aligned orifices in said parallel walls.

9. In a ladder construction as set forth in claim 8: one of said orifices in one of said walls being larger than the other of said orifices in the other of said walls; said ferrule being adapted to slidably fit through said first orifice and having only a portion of its length adapted to project through said other orifice and having a shoulder seated against said other wall around said other orifice.

10. In a ladder construction as set forth in claim 9: said portion of said rung and said aperture in said ferrule being D-shaped in cross section; and said opening and the outer periphery of said ferrule being circular in shape.

References Cited

UNITED STATES PATENTS

| | | | |
|---|---|---|---|
| 3,039,186 | 6/1962 | Stoyer | 182—228 |
| 3,060,444 | 10/1962 | Hoffmaster | 151—68 |
| 3,119,435 | 1/1964 | Greenman | 182—228 |
| 3,354,987 | 11/1967 | Werner | 182—228 |
| 3,349,870 | 10/1967 | Liebleus | 182—228 |

FOREIGN PATENTS 845,803  8/1960  Great Britain.

REINALDO P. MACHADO, Primary Examiner